(12) United States Patent
Faragher et al.

(10) Patent No.: US 12,022,278 B2
(45) Date of Patent: Jun. 25, 2024

(54) METHOD AND APPARATUS FOR PROVIDING SELECTIVE PRIVACY IN A TRACKING SYSTEM

(71) Applicant: Focal Point Positioning Limited, Cambridge (GB)

(72) Inventors: Ramsey Michael Faragher, Cambridge (GB); Robert Mark Crockett, Cambridge (GB); Peter James Duffett-Smith, Cambridge (GB)

(73) Assignee: Focal Point Positioning Limited, Cambridge (GB)

( * ) Notice: Subject to any disclaimer, the term of this patent is extended or adjusted under 35 U.S.C. 154(b) by 0 days.

(21) Appl. No.: 18/218,245

(22) Filed: Jul. 5, 2023

(65) Prior Publication Data

US 2024/0048969 A1 Feb. 8, 2024

Related U.S. Application Data

(60) Provisional application No. 63/396,213, filed on Aug. 8, 2022.

(30) Foreign Application Priority Data

Sep. 16, 2022 (GB) .................................... 2213630

(51) Int. Cl.
| | | |
|---|---|---|
| *H04W 12/02* | (2009.01) | |
| *H04W 8/16* | (2009.01) | |
| *H04W 12/63* | (2021.01) | |

(52) U.S. Cl.
CPC ............. *H04W 12/02* (2013.01); *H04W 8/16* (2013.01); *H04W 12/63* (2021.01)

(58) Field of Classification Search
CPC ....... H04W 4/029; H04W 4/02; H04W 4/023; H04W 12/08; H04W 12/02; H04W 64/00; H04W 12/06; H04W 4/025; H04W 12/63; H04W 4/026; H04W 4/21; H04W 4/027; H04W 12/00; H04W 12/03; H04W 64/003; H04W 72/541; H04W 12/069; H04W 12/088; H04W 12/10; H04W 12/104; H04W 8/205; H04W 8/16
See application file for complete search history.

(56) References Cited

U.S. PATENT DOCUMENTS

| | | | |
|---|---|---|---|
| 6,675,017 B1 | 1/2004 | Zellner et al. | |
| 2004/0223481 A1* | 11/2004 | Juels | ................ G06K 19/07336 370/445 |
| 2007/0264974 A1* | 11/2007 | Frank | .................... H04W 4/021 455/411 |
| 2009/0224970 A1* | 9/2009 | Tsau | ........................ G06F 16/29 707/999.1 |

(Continued)

FOREIGN PATENT DOCUMENTS

EP 2653969 A1 10/2013

OTHER PUBLICATIONS

UK Search and Examination Report for Application No. GB2213630.3 dated Feb. 27, 2023, 2 pgs.

*Primary Examiner* — Kwasi Karikari
(74) *Attorney, Agent, or Firm* — Moser Taboada

(57) ABSTRACT

A method and apparatus configured to create a zone of privacy within which tracking signals, transmitted by a tracking device located within the privacy zone, cannot be used to identify a location of the tracking device.

15 Claims, 4 Drawing Sheets

(56) References Cited

U.S. PATENT DOCUMENTS

| | | | |
|---|---|---|---|
| 2013/0281112 A1* | 10/2013 | Sabatelli | G01S 5/0027 455/456.1 |
| 2021/0136518 A1 | 5/2021 | Borras et al. | |
| 2021/0243548 A1* | 8/2021 | Brody | H04W 68/005 |
| 2023/0276229 A1* | 8/2023 | Todasco | H04W 12/02 726/30 |

* cited by examiner

METHOD AND APPARATUS FOR PROVIDING SELECTIVE PRIVACY IN A TRACKING SYSTEM

CROSS-REFERENCE

This application claims priority to United Kingdom Application No. 2213630.3, filed Sep. 16, 2022, which claims the benefit of and priority to U.S. Provisional Patent Application No. 63/396,213, filed Aug. 8, 2022. The entire content of each of these of these applications is incorporated herein by reference.

FIELD

Embodiments of the invention relate to tracking systems and, in particular, relate to a method and apparatus for providing selective privacy in tracking systems.

BACKGROUND

In tracking systems, tracking transmitters may be stored in, on or with objects so that, in the event of theft or loss of the objects, users can track the position of the tracking transmitters to enable recovery of the objects. As such, objects such as keys, wallets, purses, vehicles, and the like may be quickly recovered when lost or stolen. Typically, a tracking system comprises a distributed network of transceivers (e.g., user equipment such as smartphones) that intermittently receive signals from tracking transmitters that are nearby a networked transceiver. The transceiver reports the location of the tracking transmitters to a central network or server (i.e., a central body). Users can then request the location of their own tracking transmitters from a network connected tracking server to track the location of their objects. However, some tracking systems can be abused by malicious users to track an unwilling person by secreting a tracking transmitter in or with another person's belongings.

One existing approach to countering this abuse of the tracking system involves registering tracking transmitters and user equipment to the tracking server. The tracking server is configured to notify users when a tracking transmitter belonging to another (potentially malicious) user has been co-located with user equipment of a genuine user for a threshold time period. This allows the genuine user to search for and remove the tracking transmitter. However, in order to prevent large numbers of false positives, which could occur in a closed environment such as public transport, the threshold time period has to be set to a relatively long duration, such as about 5 hours. During this time, the user is vulnerable to being tracked unknowingly by malicious users of the system. Reducing this time simply increases the chance of incorrect detections of malicious trackers, which is inconvenient for end users.

It is an object of the invention to provide selective privacy to a person while maintaining the usability and effectiveness of the tracking system.

SUMMARY

Embodiments of the present invention generally relate to a method and apparatus for providing selective privacy in a tracking system as shown in and/or described in connection with at least one of the figures.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a particular description of the invention, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention comprise a method and apparatus for providing selective privacy in a tracking system. In one embodiment, a person may selectively activate a tracking inhibitor that creates a zone of privacy (i.e., comprising a zone defined by both distance and time) such that the location of a tracking device within the zone of privacy may be prevented from being located by networked transceivers within the tracking system. In operation, when a networked transceiver receives, within a time window, a privacy signal generated by the tracking inhibitor, the networked transceiver either (1) does not send tracking transmitter information (e.g., transmitter location and identification) of transmitters nearby the networked transceiver, or (2) sends the tracking transmitter information to the tracking server with a tag (i.e., a privacy tag) indicating the information was received from a transmitter within a privacy zone, or (3) sends the tracking transmitter and the tracking inhibitor information to the server and the server attaches a privacy tag to the tracking transmitter information. The tracking server will not provide the location of any transmitter that has privacy zone indicator, e.g., a privacy tag, associated with it to any networked transceiver requesting its location.

If a tracking transmitter and a tracking inhibitor are both located within a zone of privacy, and subsequently separate again outside the zone of privacy, this is referred to as a transient encounter. Once removed from the zone of privacy, the location of the tracking transmitter can be determined by the tracking system via subsequent encounters with networked transceivers outside of the range of any tracking inhibitors, and the tracking transmitter location may be provided by the tracking server to any networked transceiver requesting its location.

In one embodiment, a malicious tracking transmitter has been placed on a person or in one of their possessions, and the person is using a tracking inhibitor which creates a zone of privacy about the person or their possessions. Any nearby networked transceiver will receive the tracking inhibitor messages and the tracking transmitter messages within close proximity in time and space. In this case the tracking transmitter messages are either not forwarded to the tracking server by the networked transceiver, or are sent to the tracking server with an attached privacy tag, or a privacy tag is attached by the server, such that the location of the malicious tracking transmitter is not provided to any networked transceiver requesting its location. In this manner, a tracking system user may selectively establish a zone of privacy.

Figure 1:
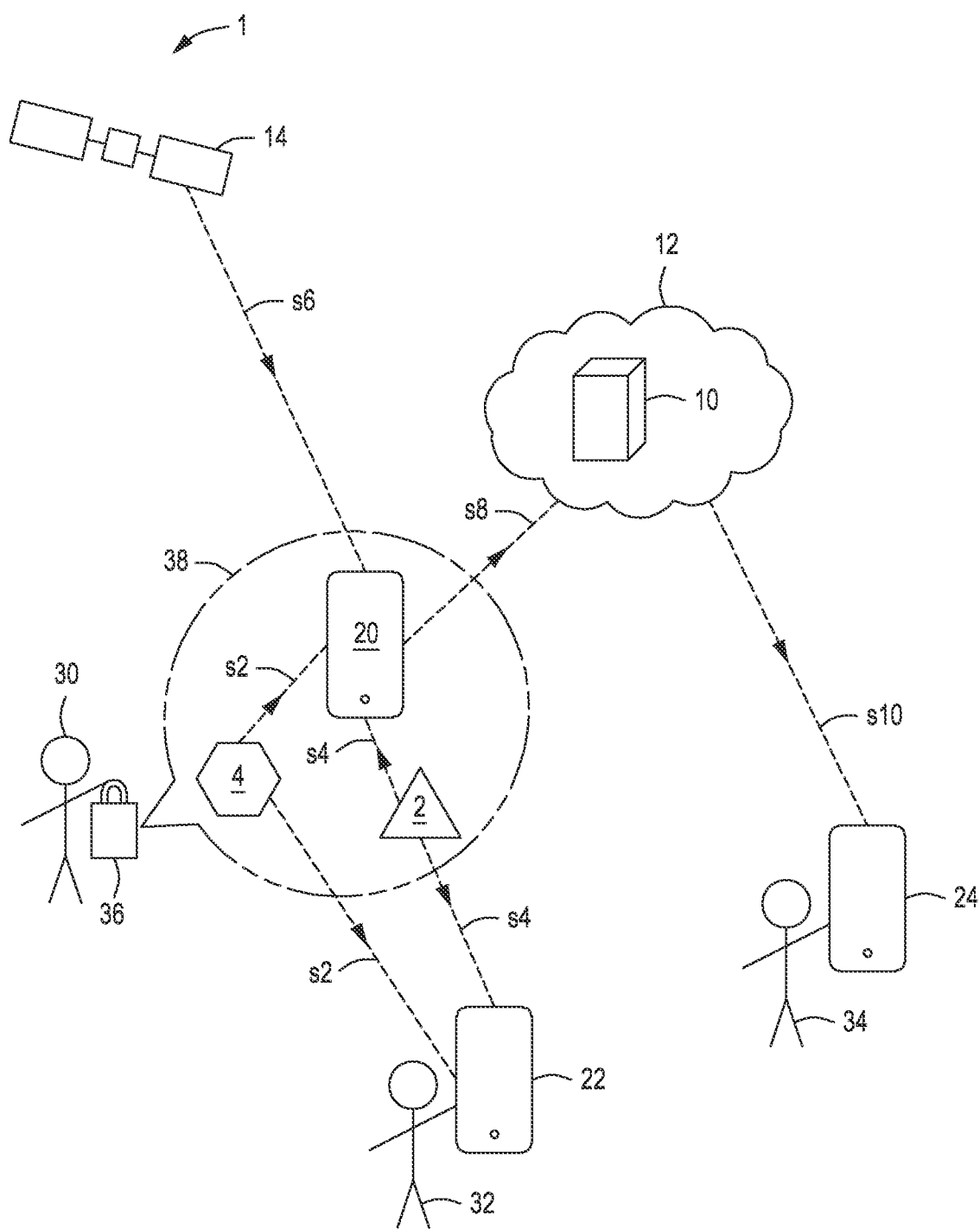
FIG. 1 is a schematic diagram of a tracking system in accordance with at least one embodiment of the invention.

FIG. 1 shows a schematic diagram of a tracking system 1 according to at least one embodiment of the invention. The tracking system 1 comprises networked transceivers (depicted as user equipment (UE) 20, 22, 24, a tracking server 10 and a communications network (cloud) 12. The server 10 is connected to, and forms part of, the cloud network 12. The plurality of UEs, including, for example, UE 20, UE 22, and UE 24, are configured to receive signals from tracking transmitters, such as tracking transmitter 2, and report the location of tracking transmitters to the server 10 using the UE positioning capabilities (e.g., processing signals s6 received from a plurality of satellites 14 of a global satellite navigation system (GNSS)). Each UE forms a networked transceiver operating as a component of the tracking system 1. The UEs may be any form of computing device having position location capabilities, including, but not limited to, smart phones, laptop computers, watches, tablets, Internet of Things (IoT) devices, and the like.

Tracking transmitters 2 are typically small emitting devices that emit a signal at regular intervals. In one embodiment, the tracking transmitter 2 comprises a battery, a controller including a processor and memory, and a transmitter for broadcasting tracking signals. Each tracking transmitter 2 broadcasts a tracking signal comprising a message that uniquely identifies the tracking transmitter using a unique identifier (ID).

During normal use of the tracking system 1, a user places a tracking transmitter in, or attached to, an object they wish to track, such as a car, wallet, purse or backpack. UEs participating in the tracking system 1 that are nearby the tracking transmitter detect signals transmitted by the tracking transmitter (e.g., UEs 20 and 22 receive signal s4 from tracking transmitter 2). The tracking transmitter signals typically comprise a message that contains a unique identifier (ID) for that particular tracking transmitter. The UE receiving the tracking transmitter's signal forwards the tracking transmitter's message and the UE's location at the time of tracking signal reception, which approximately corresponds to the location of the tracking transmitter, to the tracking server 10. In one embodiment, the tracking transmitter 2 may communicate using Bluetooth and, as such, has a range of approximately 10 meters.

The owner 30 of the tracking transmitter 2 may request the location of their tracking transmitter 2 from the tracking server 10. For example, the UE 20 sends a location request message (using the transmitter's ID) to the server 10 and, in response, the server 10 sends the last reported location of the tracking transmitter 2. Thus, upon misplacing a tagged object, the owner 30 may determine the object's location. Users, generally, are not able to request locations of other users' tracking transmitters from the server 10, i.e., an individual tracking transmitter 2 is paired with the owner's UE 20. In this way, the tracking system 1 provides a secure approach to tracking objects. One exemplary tracking system is available from Apple Inc. of Cupertino, California which uses AIRTAG® devices as the tracking device and smartphones (either iPHONE® or ANDROID® handsets) as the networked transceiver UE.

One vulnerability of the tracking system 1 is illustrated in FIG. 1 together with a solution produced by various embodiments of the present invention. A first user 30, second user 32 and third user 34 of the tracking system 1 are shown, which operate the first UE 20, the second UE 22 and the third UE 24, respectively. The first user 30 carries a handbag 36 containing contents 38 comprising the first UE 20 and the tracking transmitter 2. In this example, the tracking transmitter 2 belongs to the third user 34, who has maliciously placed the tracking transmitter 2 inside the handbag 36 of the first user 30 without the first user's 30 consent or awareness. The third user 34 intends to track the first user 30 by monitoring the location of the tracking transmitter 2 via the tracking server 10 and other UEs that detect the tracking transmitter 2, such as the first UE 20 and the second UE 22, which are nearby the first user 30.

One approach to mitigating this abuse of the tracking system 1 involves determining that a particular UE and a particular tracking transmitter have been co-located for a minimum amount of time and notifying the particular UE in response. The owner of the UE can then search for and remove the maliciously placed tracking transmitter stowed in their belongings. However, it is necessary to set this threshold time to a relatively long duration, such as 4 or 5 hours or longer, to avoid a large number of false positives resulting from closed environments, such as long train journeys or cinemas. In the meantime, the malicious third user 34 can use the tracking system 1 to track the first user 30.

To mitigate this issue using an embodiment of the invention, a UE may selectively establish a zone of privacy, in time and space, such that tracking transmitters within the zone of privacy are not able to be tracked. The UEs 20, 22, 24 are configured to receive signals from tracking inhibitors. A tracking inhibitor may be a standalone device, such as device 4, or may be a feature of a UE, such as UE 20, implemented using an application or a bespoke transmitter in the UE. The following description focuses upon the operation of a standalone device 4, but the description is applicable to incorporating the tracking inhibitor functions into a UE. As such, a UE may selectively establish a zone of privacy nearby the UE through activation of a tracking privacy mode of operation.

In operation, the tracking inhibitor 4 emits a signal comprising an ID that identifies the device as a tracking inhibitor. In one embodiment, the inhibitor signal may be similar to a tracking transmitter signal. In other embodiments, the inhibitor signal may comprise inherent signal characteristics (e.g., frequency, modulation, pattern, etc.) that identifies the inhibitor as an inhibitor.

The first UE 20 and the second UE 22, which is nearby the first user 30, each receive a signal s2 from the tracking inhibitor 4. The first UE 20 and the second UE 22 also receive a signal s4 from the tracking transmitter 2. In one embodiment, if UE 22 and/or UE 20 have previously received the inhibitor signal s4, the receiving UE will not forward information (e.g., ID and location) regarding the tracking transmitter 2 to the tracking server 10. In another embodiment, the receiving UE may forward information (e.g., ID and location) regarding the tracking transmitter 2 to the tracking server 10 in the usual manner; however, the information is tagged (either by the receiving UE or at the server 10) to indicate the tracking transmitter 2 is within a zone of privacy. In response, the server 10 will not share the location of the tracking transmitter 2 with any UE requesting its location (such as UE 24 operated by a malicious user 34).

In various other embodiments, the server 10 may take a number of different approaches to improving the privacy of the first user 30. In one example, the tracking server 10 may send a delayed response message that provides the location to the UE 24, thereby preventing the malicious user 34 from tracking the first user's 30 location in real time. In another example embodiment, the server 10 may send a rejection response message s10 that does not contain a location.

In one embodiment, the zone of privacy may be a geographic region surrounding the tracking inhibitor (e.g., a range of operation of a Bluetooth transmitter, about 10 meters). As such, all tracking transmitter signals in the zone will have their tracking capabilities inhibited. In other embodiments, the zone of privacy may include a time component such that tracking signals received before or after an inhibitor signal is received may be tracking inhibited. For example, a tracking transmitter may broadcast a tracking signal and a tracking inhibitor may broadcast an inhibitor signal subsequent to the tracking signal. The tracking server 10 would inhibit use of the tracking transmitter information in view of the subsequently received inhibitor signal. A window of time may be established for the time-based zone of privacy, e.g., 10 minutes. Any tracking signal received by a networked transceiver is inhibited if the tracking signal is received within this time window surrounding the last inhibitor signal reception time.

In other embodiments, the user equipment 20 of the owner 30 of the tracking inhibitor 4, may be configured to transmit inhibitor flag free tracking transmitter information for any tracking transmitter that is paired with the owner's user equipment 20. In this manner, using a tracking inhibitor 4 will not interfere with the ability of the owner's user equipment to send tracking information to the server for tracking transmitters with which it is paired.

Figure 2:
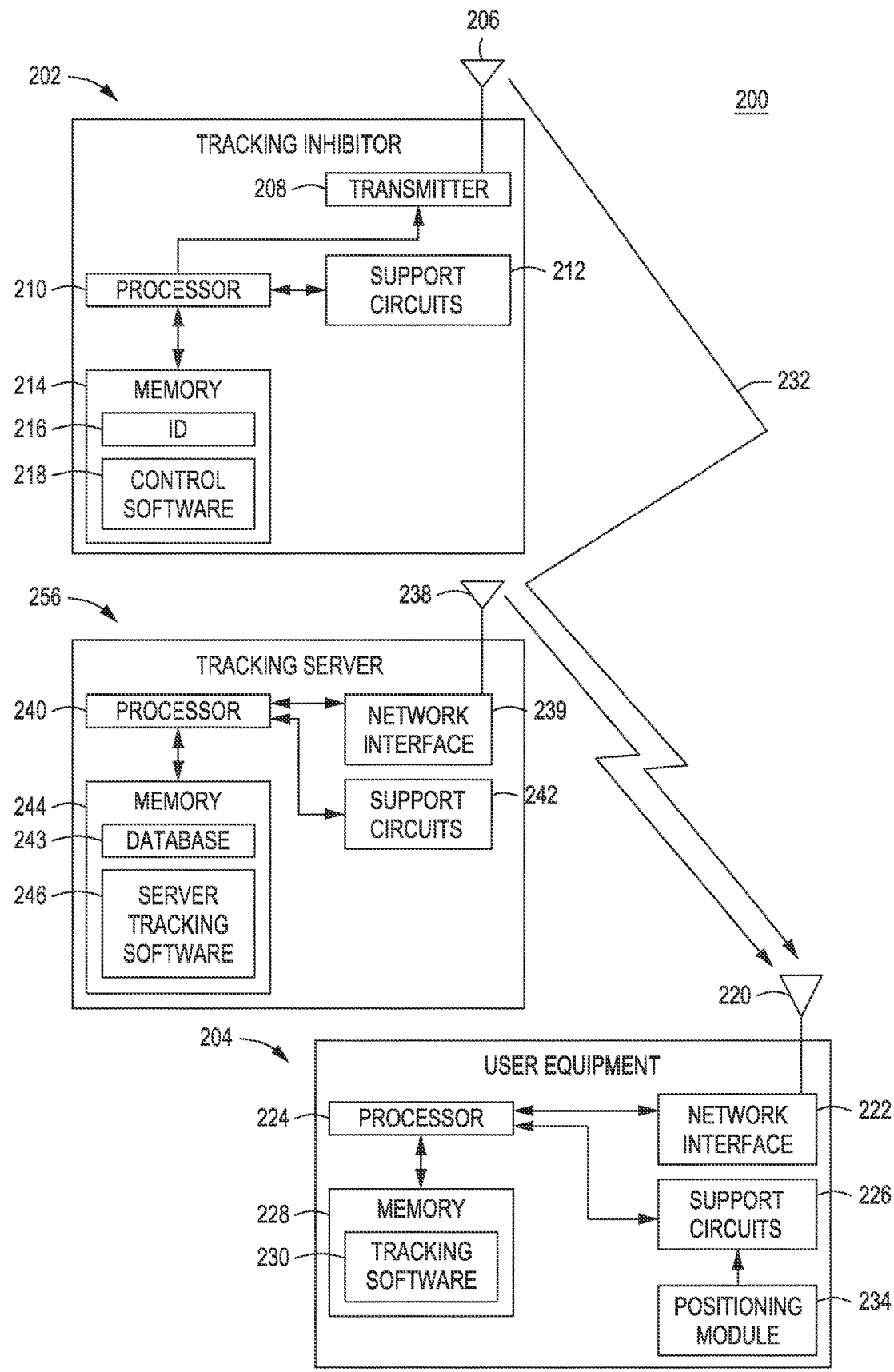
FIG. 2 depicts a block diagram of an operational scenario comprising a tracking inhibitor and user equipment operating in accordance with at least on embodiment of the invention.

FIG. 2 depicts a block diagram of a scenario 200 comprising a tracking inhibitor 202, user equipment 204 and a tracking server 256 operating in accordance with at least one embodiment of the invention. In one embodiment, the tracking inhibitor 202 comprises an antenna 206, a transmitter 208, a processor 210, support circuits 212 and memory 214. As mentioned above, the tracking inhibitor may be a standalone device (device 4 in FIG. 1) or may be implemented using software executing within a user device (such as user device 20 in FIG. 1).

In one embodiment, the transmitter 208 may transmit an ultra-wideband (UWB) or Bluetooth signal using antenna 206. In other embodiments, other signal characteristics may be used, for example, WiFi, low power communications, near field communications, ZigBee, and the like. The transmitter 208 is controlled by a processor 210 coupled to support circuits 212 and memory 214. The processor 210 may be any form of processor or combination of processors including, but not limited to, central processing units, microprocessors, microcontrollers, field programmable gate arrays, graphics processing units, digital signal processors, and the like. The support circuits 212 may comprise well-known circuits and devices facilitating functionality of the processor(s). The support circuits 212 may comprise one or more of, or a combination of, power supplies (battery), clock circuits, analog to digital converters, cache, displays, activation or failure indicators, and/or the like.

The memory 214 comprises one or more forms of non-transitory computer readable media including one or more of, or any combination of, read-only memory or random-access memory. The memory 214 stores the tracking inhibitor's ID 216 (i.e., an indication that the signal being transmitted is from a tracking inhibitor) and control software 218. The control software 218 contains instructions that, when executed by the processor 210, cause the tracking inhibitor 202 to transmit inhibitor signals containing the ID 216. The ID may be as simple as a particular modulation, frequency of transmission, or other form of identification. In other embodiments, the ID may be a code that uniquely identifies the tracking inhibitor 202 and is encoded into the transmission signal. In other embodiments, all inhibitors have the same code and the code is only used to establish the zone of privacy (i.e., to inform a UE that an inhibitor is nearby and tracking signals should be handled appropriately for the zone of privacy).

The control software 218 further controls the periodicity of the transmissions. In one embodiment, the inhibitor signals are continuously broadcast. In other embodiments, the signals are transmitted periodically or intermittently. The timing of the transmissions may be adjusted based upon battery charge, i.e., transmit less often when the battery charge is low.

The transmissions (indicated by arrow 232) of the tracking inhibitor 202 are intended to be received by user equipment (UE) 204. The UE 204 comprises an antenna 220, a transceiver 222, processor 224, support circuits 226, memory 226 and positioning module 234. The transceiver 222 may comprise multiple transceivers to enable the UE 204 to receive inhibitor transmissions and tracking device transmissions as well as communicate with the tracking server via the network, e.g., communicate via WiFi, cellular, etc. types of commonly used network communications signals. Thus, the transceiver 222 can also perform the function of one or more communication interfaces, such as a network interface. In the tracking system context, the UE 204 uses the antenna to receive the inhibitor transmissions 232. The transceiver 222 processes the received signals and couples the information contained in the signals to the processor 224. If the received signal is a tracking signal or an inhibitor signal, the information may be the tracking transmitter or inhibitor ID. In other embodiments, separate transmitter, receiver, and communications interfaces may be provided in the UE 204. The support circuits 212 may comprise a display configured to show (or not show, if privacy protection is required) a location of a tracking transmitter to a user.

The processor 224 may be any form of processor or combination of processors including, but not limited to, central processing units, microprocessors, microcontrollers, field programmable gate arrays, graphics processing units, digital signal processors, and the like. The support circuits 226 may comprise well-known circuits and devices facilitating functionality of the processor(s). The support circuits 226 may comprise one or more of, or a combination of, power supplies (battery), clock circuits, analog to digital converters, cache, displays, indicators, graphical user interface, and/or the like.

The memory 228 comprises one or more forms of non-transitory computer readable media including one or more of, or any combination of, read-only memory or random-access memory. The memory 228 stores tracking software 230. The tracking software 230 contains instructions that, when executed by the processor 224, cause the UE 204 to perform tracking system functions as described in detail with respect to FIG. 3 below. Together, the memory 228 and the processor 224 can act as a controller for performing operations of the methods discussed herein.

The positioning module 234 may comprise a GNSS receiver and/or an inertial navigation system (INS). The positioning module 234 provides a position of the UE 204 at about the time the UE 204 receives a tracking signal from a tracking transmitter.

The tracking server 256 comprises a network input 238, a network interface 239, a processor 240, support circuits 242 and memory 244. In one embodiment, the network input is coupled to a communications network such that signals from the user equipment 204 are routed to the tracking server 256 as is known in the art. The network interface 239 is coupled to a processor 240 to facilitate sending and receiving network communications including tracking transmitter and inhibitor related information. The processor 240 is coupled to support circuits 242 and memory 244. The processor 240 may be any form of processor or combination of processors including, but not limited to, central processing units, microprocessors, microcontrollers, field programmable gate arrays, graphics processing units, digital signal processors, and the like. The support circuits 242 may comprise well-known circuits and devices facilitating functionality of the processor(s). The support circuits 212 may comprise one or more of, or a combination of, power supplies (battery), clock circuits, analog to digital converters, cache, displays, activation or failure indicators, and/or the like.

The memory 244 comprises one or more forms of non-transitory computer readable media including one or more of, or any combination of, read-only memory or random-access memory. The memory 244 stores a tracking information database 243 and server tracking software 246. The tracking software 246 contains instructions that, when executed by the processor 240, cause the tracking server 256 to update the tracking database 243 with tracing transmitter and/or inhibitor information as well as handle tracking requests as described below with respect to FIG. 4.

Figure 3:
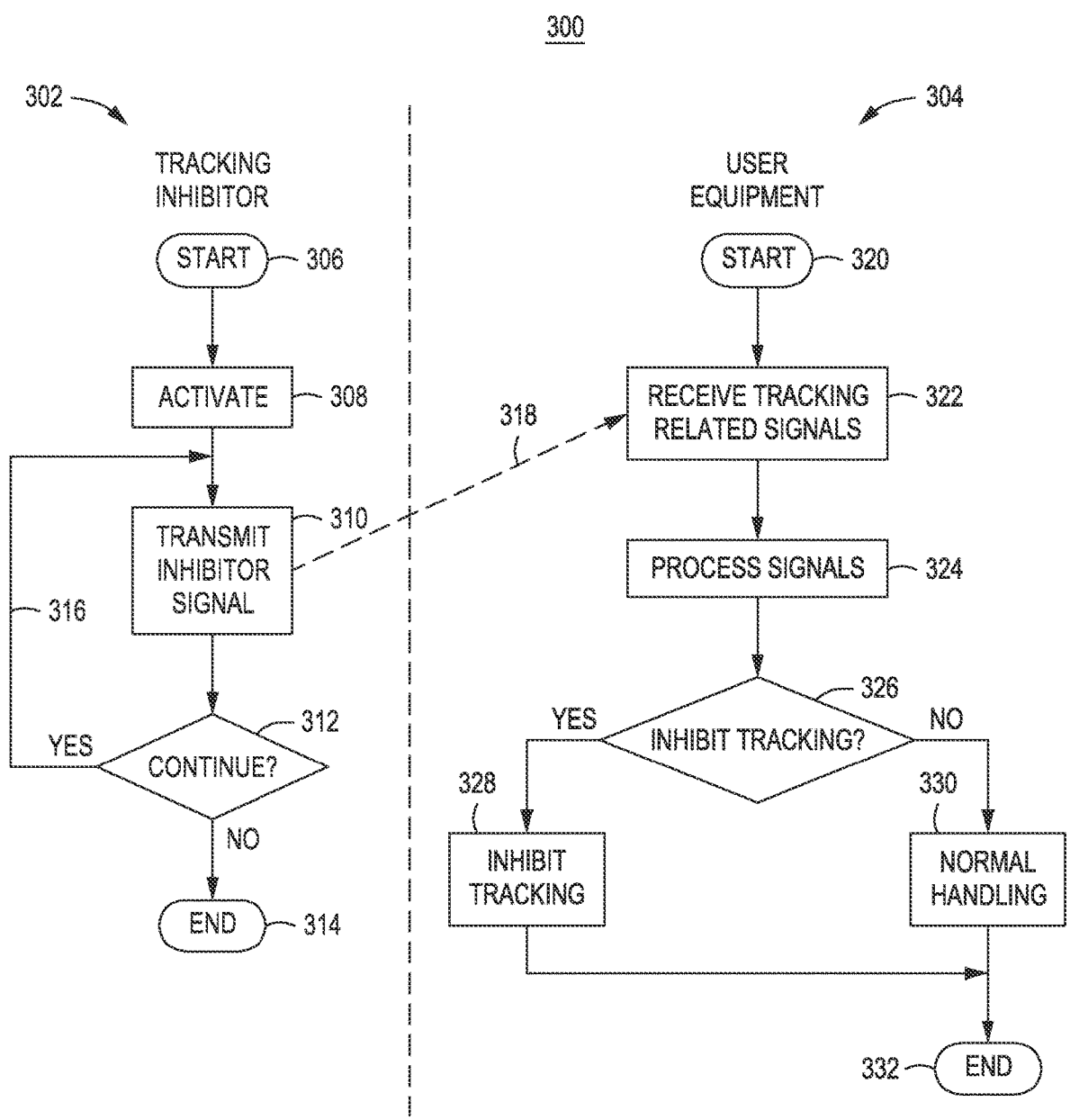
FIG. 3 depicts a flow diagram representing a method of operation of a tracking inhibitor and user equipment in accordance with at least one embodiment of the invention.

FIG. 3 depicts a flow diagram representing a method 300 of operation of a tracking inhibitor (202 of FIG. 2 or 4 in FIG. 1) and tracking system (1 of FIG. 1) in accordance with at least one embodiment of the invention. The method 300 comprises the method 302 of operation of the tracking inhibitor and the method 304 of operation of the tracking system. The method 302 begins at 306 and proceeds to 308 where the tracking inhibitor is activated to selectively generate a zone of privacy. At 310, the method transmits an inhibitor signal 318 as described with respect to FIG. 2 above. At 312, the method 302 queries whether the tracking inhibitor is to continue transmitting the inhibitor signal. If the query is affirmatively answered, the method 300 proceeds along path 316 to continue transmitting an inhibitor signal. In one embodiment, path 316 may contain a delay (not shown) that may be used to control the periodicity of the inhibitor signal transmissions. If the query at 312 is negatively answered, the method 300 ends at 314.

The method 304 begins at 320 and proceeds to 322 where tracking related signals are received. These signals may be tracking signals from a tracking transmitter or tracking inhibitor signals from a tracking inhibitor. At 324, the received signals are processed. If the received signal is a tracking signal, the processing at 324 extracts the transmitter ID and determines the location of the UE receiving the transmission from the positioning module (234 in FIG. 2). If the received signal is an inhibitor signal, the processing at 324 identifies the signal as an inhibitor signal and, if an ID is used, the ID is extracted from the received inhibitor signal.

At 326, the method 304 queries whether tracking should be inhibited or whether the received signal is an inhibitor signal. If the query is answered negatively, the method 304 proceeds to 330 where the received tracking signal is handled normally, i.e., the tracking transmitter's ID and the UE location are transmitted to the tracking server (or "reported" to the tracking server in a report) and the location may be available to be sent to the UE that is paired with the tracking transmitter having the transmitter ID.

If the query at 326 is affirmatively answered, the method 304 proceeds to 328 to respond to the existence of a zone of privacy. Tracking is to be inhibited, but the response, in a first embodiment, may be performed by the UE that received the inhibitor signal or, in other embodiments, may be performed in various ways at the tracking server.

In the first embodiment, in view of receiving an inhibitor signal, the UE does not transmit the tracking information (ID and location) to the tracking server. The method 304 ends at 332. In this manner, if the tracking signal is received within a zone of privacy (within geographic and/or time limits), the UE suppresses transmission of the received tracking information and there is no tracking information regarding the protected transmitter in the tracking server for a malicious user to request. Consequently, the server would respond to any such request with a "tracker not found" message, "tracking inhibited" message or other such rejection message. In this embodiment, the UE alone facilitates implementation of the zone of privacy.

In the other embodiments, the server performs all or a portion of the process for establishing the zone of privacy. In one server-based embodiment, in view of receiving the inhibitor signal, the UE transmits the tracking information along with a privacy indicator (i.e., a privacy tag or flag) to the tracking server. The time of inhibitor signal reception and/or tracking signal reception may also be included in the message. The privacy indicator may be inserted into a typical tracking message containing the tracking transmitter ID and UE location. In another server-based embodiment, the UE forwards any inhibitor signal received to the server along with a UE location. In essence, the inhibitor is treated by the UE as any other tracking transmitter signal—the inhibitor ID and the UE location are sent in a tracking message to the tracking server. The time of inhibitor signal reception may also be included in the message. The procedure used by the server to handle tracking information regarding tracking transmitters and inhibitors is described in detail with respect to FIG. 4. Once the received tracking and/or inhibitor signals are handled, the method 304 ends at 332.

Figure 4:
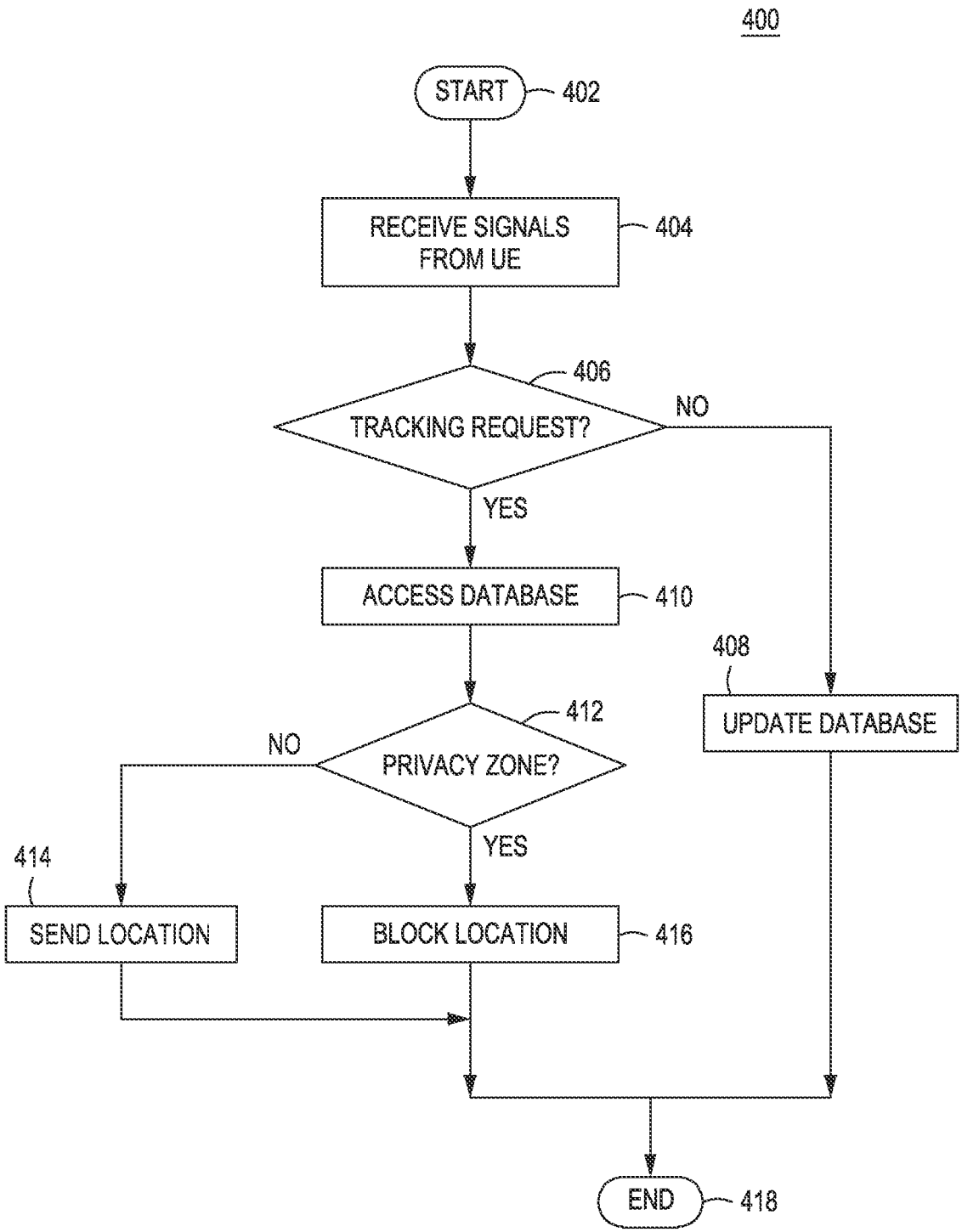
FIG. 4 depicts a flow diagram representing a method of operation of a tracking server in accordance with at least one embodiment of the invention.

FIG. 4 depicts a method 400 of operation of a tracking server (256 in FIG. 2) in accordance with at least one embodiment of the present invention. The method 400 begins at 402 and proceeds to 404 where the method 400 receives signals from the UE (i.e., receives tracking information or tracking requests). At 406, the method queries whether the received signal is a tracking request, i.e., a UE is requesting the location of a tracking transmitter. If the query is negatively answered, then the request is a message carrying tracking information regarding a tracking transmitter and/or a tracking inhibitor. As such, the method 400 proceeds to 408 to update the tracking database.

In one embodiment, if the tracking information contains tracking transmitter information, the database is updated with the current location of the tracking transmitter. If the tracking information contains a privacy indicator (privacy flag within the tracking transmitter message), the server updates the database to indicate that the tracking information for the particular transmitter related to the message is in a privacy zone.

In another embodiment, the received signal may be from a tracking inhibitor. As such, the method 400 determines which tracking transmitters are located within the zone of privacy surrounding the inhibitor location. The server or a user may establish the extent (range) of the inhibitor, e.g., setting the range to inhibit any tracking transmitter within a 50 meter radius of the inhibitor. The method 400 sets a privacy indicator (tag or flag) for any transmitter within the radius. The method 400 may also define a time range to set the privacy tag for any tracking transmitter signal received by a UE within a time window ranging before and after the time of inhibitor signal reception. Thus, a tracking transmitter signal received a few seconds/minutes before or after inhibitor signal reception would be considered to be within the privacy zone and the method 400 sets the privacy tag for that transmitter. In these various manners, the method 400 at 408 updates the tracking database with tracking transmitter information as well as with privacy zone information for the tracking transmitters.

If at 406, the query is affirmatively answered and the received UE signal is a tracking request, the method 400 proceeds to 410. At 410, the method 400 accesses the tracking database using the tracking transmitter ID contained in the tracking request. At 412, the method 400 queries whether the tracking information related to the tracking ID indicates a privacy zone. If the query is negatively answered, the method 400 proceeds to 414, where the request is handled normally using a first type of response message and the location of the tracking transmitter is sent to the requesting UE in the first type of response message. However, if the query at 412 is affirmatively answered, the method proceeds to 416 where the request is blocked and the location of the tracking transmitter is not sent to the requesting UE. The server may reply to the request for a location in a privacy zone using a rejection message that indicates to the requesting UE that the transmitter is currently located in a privacy zone and the location is unavailable.

In other embodiments, the server may reply to the malicious user's request for a location using a second type of response message that is different from the first type. The second type of response message can include the requested location but be sent after a delay such that a tracking transmitter within a zone of privacy cannot be tracked in real-time. In another embodiment, the second type of response message may provide the location together with an indicator, such as a privacy tag, to indicate the receipt of a signal from a tracking inhibitor at or near the requested location. This allows the receiving UE to take privacy protecting measures.

Once the method 400 has completed processing the received signal, the method 400 ends at 418.

Embodiments of the tracking system 1 may utilise encryption keys, wherein a single user's user equipment and tracking transmitters may share a private encryption key via a pairing operation. Communications between each UE and the tracking server 256 may be encrypted using such keys as known in the art.

In a further scenario, one potential abuse of the tracking system 1 could occur when a thief attempts to mask the theft of an item that they suspect contains a hidden tracking transmitter stored therein. In this case, the thief may carry a tracking inhibitor to prevent tracking of the stolen item. To prevent this potential abuse of the tracking system 1, on instruction from a user the UE 204 can be configured to send a special kind of request to the tracking server 256 that reports a stolen item and requests the location of a tracking transmitter stored in the stolen item. In order to validate the special request, a special security condition may need to be fulfilled. In one example, a police report may need to be filed and provided along with the special request. A human administrator may be required to accept or reject the special request. If the special request is accepted, the tracking server 256 and/or the UE 204 may be configured to provide access to the location of the stolen item even though a signal from a tracking inhibitor was detected at the location of the stolen item. As an extra security precaution, the tracking server 256 may only provide the location of the stolen item to the police or another independent body, rather than the UE 204.

Further aspects of the tracking inhibitor 202 will now be described. The tracking inhibitor 202, implemented as a standalone transmitter or as a function of a UE in the tracking system 1, may be operable in one of a first mode and a second mode and may be switchable between modes. In the first mode, the tracking inhibitor 202 may be configured as described above, i.e., to notify nearby user equipment that user privacy should be protected. In the second mode, the tracking inhibitor 202 may be configured to operate in the same way as the tracking transmitters as described previously. This allows each tracking inhibitor 202 to act as a tracking transmitter for tracking lost items or as a tracking inhibitor for protecting user privacy as required by the user.

In one example implementation, the tracking inhibitor 202 may have an additional ID stored in the memory 214 associated with the second mode. In the second mode, the tracking inhibitor may broadcast signals comprising the additional ID instead of the ID 216 associated with the first mode.

In another example, the tracking inhibitor 202 may be programmed permanently into the first mode or the second mode during an initial pairing process with a user equipment 204. For example, a paired user equipment 204 may ask the user whether to initialise the ID 216 as a tracking inhibitor ID or a tracking transmitter ID and may inform the tracking server 256 accordingly. Alternatively, the tracking inhibitor 202 may be switchable between the first and second modes by a user input. In one example, the user input could be provided using a physical input mechanism on the tracking inhibitor 202, which may change the ID that is broadcast in transmitted signals. In another example, the user input could be provided wirelessly using a paired user equipment 204, which may be more secure than a physical switch. As described previously, the tracking inhibitor 202 may be provided as a smartphone, or an application running on a smartphone. In this case, the application or smartphone may be configured changeable between the first mode and the second mode in a similar manner to a standalone tracking inhibitor 202.

The tracking server 256 may be configured to enable users unrestricted access to locations of their own tracking transmitters whose location was reported to the tracking server 256 in the vicinity of their own tracking inhibitors 202. In one example, a request sent by a UE 204 for a location of a tracking transmitter may contain an ID that allows the tracking server 256 to determine a registered user of the requesting UE 204. The tracking server 256 may then compare an ID of the tracking transmitter and an ID of the tracking inhibitor 202 included in a report from a UE stored in the database 243 (e.g., the same or a different UE). The tracking server 256 may check whether the IDs of the tracking inhibitor 202 and tracking transmitter correspond to the same registered user sending the request for the location. This check may be performed by communicating with a separate server or network node that manages the registration of devices in the tracking system 1 to specific owners or users. Alternatively, the tracking server 256 may administrate the tracking system 1 itself and perform this check internally. If the users are determined to match, then the tracking server 256 may provide access to the location to the requesting UE. Thus, the tracking server 256 may perform a whitelisting function for each user.

Example Embodiments

According to a first aspect of the invention, there is provided a user equipment for use in a tracking system, comprising: a receiver configured to receive a first signal from a first tracking transmitter and a second signal from a tracking inhibitor; an interface configured to communicate with a server; a positioning module configured to establish a first location of the user equipment; and a controller configured to, in response to receiving the first signal at the receiver, determine whether the second signal has been received at the receiver; wherein, in response to determining that the second signal has not been received, the controller is configured to report the location of the tracking transmitter by sending, to the server via the interface, a first report including the first location and an identifier of the tracking transmitter; and wherein, in response to determining that the second signal has been received, the controller is configured to preserve user privacy by not sending the first report.

Users of the tracking system or other persons concerned about being tracked can carry a tracking inhibitor on their person or can store tracking inhibitors in their home and with various belongings. The user equipment, or user devices, in the tracking system, which are responsible in the system for reporting the location of tracking transmitters to the server, can detect the presence of the tracking inhibitor and can actively fail to report the first location to the server using the first report. The user equipment may not report the first location at all, or alternatively may report the first location in a different manner so that the server is notified of the need to handle the first location more securely. Consequently, a malicious owner of the tracking transmitter can be prevented from accessing the first position of the tracking transmitter. By checking for the presence of a tracking inhibitor before sending the first report in this way, the user equipment protects the privacy of users carrying tracking inhibitors who do not wish to be tracked.

Advantageously, this way of protecting user privacy is effective immediately, i.e., as soon as the tracking transmitter of the malicious user is secreted in or among the belongings of a victim or unwilling user. In contrast, known methods involve waiting until the tracking transmitter and the user equipment (belonging to different users) are co-located for a threshold time period, which is necessary to avoid large numbers of false positives but leaves users vulnerable before the threshold time period has been reached. One additional advantage is that configuring the user equipment to check for tracking inhibitors in this way does not require a modification to existing tracking transmitters. In general, user equipment and servers can be updated easily and wirelessly with new functionality, making this solution backwards compatible.

The user equipment can be any type of user device or system suitable for use in the tracking system, such as a smartphone, laptop, tablet or a wearable device such as a smartwatch.

The first signal and the second signal may each comprise an identifier for identifying a registered owner of the tracking transmitter or the tracking inhibitor, respectively. For example, the first and second signals may comprise device identifiers, wherein each device is registered to an owner at the server.

The controller may be configured to determine whether the second signal has been received within a threshold time period, such as 30 seconds or 1 minute, from receipt of the first signal. Alternatively, the controller may determine if the first and second signals are being received simultaneously, which may be functionally similar to selecting a very short threshold time period, such as 1 or 2 seconds. Alternatively, or in addition, the controller may be configured to determine whether the second signal has been received at, or within a threshold distance from, the current location of the user equipment.

The controller may comprise one or processors and one or more memory units.

The receiver may be provided together with a transmitter in a transceiver and may also be provided separately. The interface may be provided as a separate component in the user equipment or may be combined with the transceiver in a single component.

The tracking inhibitor may be provided as a transmitting device configured to transmit signals for receipt by various user equipment that informs each receiving user equipment to protect user privacy, or to create a "zone of privacy". Thus, the "tracking inhibitor" inhibits tracking by sending an appropriate cue to a receiving user equipment and does not prevent other transmitting devices from broadcasting signals per se. The tracking inhibitor as described herein may also be referred to as an anti-tracking transmitter.

In some embodiments, in response to determining that the second signal has been received, the controller is configured to preserve user privacy by not sending the first location to the server. In this way, the server is made completely unaware of the location of the tracking transmitter, so that a malicious user is not able to use the server to track the location of the tracking transmitter.

In some embodiments, in response to determining that the second signal has been received, the controller is configured to preserve user privacy by sending, to the server via the interface, a second report including the first location, wherein the second report is modified with respect to the first report.

The first report may be a default type of report used by the user equipment to report locations when a signal from a tracking inhibitor is not being received, or has not been received for a threshold time period. The server can be configured to provide users unrestricted access to locations of their own tracking transmitters for locations reported in the same manner as the first report. In some scenarios, it may be advantageous to retain the first location even if the tracking inhibitor is detected at the first location. In one example scenario, a thief could attempt to use a tracking inhibitor to prevent a stolen item from being tracked by a (non-maliciously placed) tracking transmitter stored in the item. In this case, it would be advantageous to retain the possibility of accessing the first location. Accessing restricted locations may be restricted to certain users, such as the police, who may need to fulfil a special security condition (such as providing proof of a warrant) to access restricted locations.

The second report can therefore be a different type of report that informs the server to handle the first location in a more secure way. In one example implementation, the server may not provide access to the first location if it is received in the second report. In another example, the server may implement a delay before the first location in the second report can be accessed. The second report can be modified in a number of ways with respect to the first report, for example using a different message header or a flag.

In some embodiments, the second report comprises an indicator configured to indicate to the server that the second signal has been received at or near the first location. In this way, the user equipment can report the first location in a way that alerts the server to the presence of a tracking inhibitor at the first location. This enables the server to handle the first location more securely. The indicator can be any kind of indicator, such as a message header, an identifier, or some other type of flag or tag included in the second report.

In some embodiments, the second signal comprises a first identifier associated with the tracking inhibitor and the indicator comprises the first identifier. In this way, by providing the first identifier in the second report, the user equipment informs the server which tracking inhibitor is at the first location. This can have a variety of uses. In one example, the server can be configured to provide unrestricted access to users of locations of their own tracking transmitters when their locations were reported in the vicinity of their own tracking inhibitors. In another example, emergency services may be able to override all tracking inhibitors. The identifier could be configured to identify a particular tracking inhibitor or a particular user.

The first signal may comprise a second identifier configured to identify the owner of the tracking transmitter, or the tracking transmitter itself (which could also be registered to an owner), that is also included in the first and/or second report.

In some embodiments, the user equipment comprises a display for displaying a location, wherein the controller is configured to enable the display to show the second location on the display only if a security condition is satisfied.

In this way, the user equipment protects the privacy of other users by displaying the second location only if the security condition is satisfied. This prevents malicious users of the user equipment from tracking the position of their maliciously placed second tracking transmitter. Alternatively, the server may only send the third report if a security condition is satisfied and the controller may be configured to display any location received from the server.

In some embodiments, the condition is whether the third report is determined not to include an indicator configured to indicate that a signal from a tracking inhibitor was received at or near the second location. In this way, the user equipment avoids displaying locations of tracking transmitters that are close to tracking inhibitors, protecting the privacy of users carrying tracking inhibitors.

According to a further aspect of the invention, there is provided a method, performed in a tracking system, comprising: receiving a first signal from a first tracking transmitter; establishing a first location; in response to receiving the first signal, determining whether a second signal from a tracking inhibitor has been received; in response to determining that the second signal has not been received, reporting the location of the tracking transmitter by sending, to a server, a first report including the first location and an identifier of the tracking transmitter; and in response to determining that the second signal has been received, preserving user privacy by not sending the first report.

According to a further aspect of the invention, there is provided a non-transitory computer readable medium storing executable instructions that, when executed by a computer, cause the computer to perform steps comprising: receiving a first signal from a first tracking transmitter; establishing a first location; in response to receiving the first signal, determining whether a second signal from a tracking inhibitor has been received; in response to determining that the second signal has not been received, reporting the location of the tracking transmitter by sending, to a server, a first report including the first location and an identifier of the tracking transmitter; and in response to determining that the second signal has been received, preserving user privacy by not sending the first report.

According to a second aspect of the invention, there is provided a server computer for use in a tracking system, comprising one or more processors configured to: receive and store, from a plurality of user equipment, a first report including a first location of a first tracking transmitter and a second report including a second location of a second tracking transmitter and a first indicator configured to indicate that a signal from a tracking inhibitor has been received by one of the plurality of user equipment at or near the second location; receive a first request from a first user equipment of the plurality of user equipment for the first location and, in response, grant the first request by sending the first location to the first user equipment in a first response message of a first type of response message; and receive a second request from a second user equipment of the plurality of user equipment for the second location and, in response, at least partially inhibit access to the second location by not sending the second location to the second user equipment in the first type of response message.

In this way, the server handles certain locations reported to have nearby tracking inhibitors more securely compared to locations that do not have nearby tracking inhibitors. This allows genuine users of the system to carry a tracking inhibitor in order to protect against stalking attempts by a malicious user (e.g., the owner of the second user equipment) who stashes a tracking transmitter on the genuine user. The plurality of user equipment can detect the tracking inhibitor alongside the tracking transmitter and report the second location of the second tracking transmitter along with the first indicator. The server is then notified of a need to restrict access to the second location.

In contrast, at the first location, there is no detectable tracking inhibitor near the first tracking transmitter. Thus, the plurality of user equipment reports the first location to the server without an indicator, and the server is made aware it can safely provide less restricted access to the first location to the first user equipment.

The first report may comprise an identifier of the first tracking transmitter. The second report may comprise an identifier of the second tracking transmitter. The requests for the first and second locations may be made by the first and second user equipment using the identifiers of the first and second tracking transmitters, respectively.

In some embodiments, the one or more processors are configured to fully inhibit access to the second location by responding to the second request with a rejection message that does not include the second location. In this way, the second user equipment is made completely unaware of the second location. This may be advantageous compared to sending a more secure message to the second user equipment including the second location. For example, this could present an opportunity for malicious users of the second user equipment to hack the second location, even if the second user equipment would otherwise have attempted to prevent access to the second location.

In other embodiments, the one or more processors are configured to partially inhibit access to the second location by sending the second location to the second user equipment in a second response message of a second type modified with respect to the first type of response message to indicate the receipt of a signal from a tracking inhibitor at or near the second location. In this way, the server delegates some responsibility for protecting user privacy to the second user equipment.

Accordingly, in some embodiments, it may be preferable to send a second type of response message that alerts user equipment to the presence of tracking inhibitors at the location in the response message. This enables the user equipment to take precautions to preserve user privacy.

In some embodiments, the second response message includes the first indicator. Equally, the second type of response message may be configured to include an indicator reflecting the detection of the tracking inhibitor at the corresponding location in the second type of response message. In this way, the second user equipment can determine based on the indicator whether or not to provide access to the second location. Alternatively, the second response message, or second type of response message, may include a different kind of indicator from the first indicator.

In some embodiments, the first indicator comprises an identifier configured to identify an owner of the tracking inhibitor, or the particular tracking inhibitor.

In some embodiments, in response to receiving the second report, the one or more processors are configured to determine that a stored third report including a third location was received within a threshold time period from receipt of the second report and modify the stored third report to include a second indicator configured to indicate that a signal from a tracking inhibitor was received at or near the third location. In this way, the server can protect certain locations at which a tracking inhibitor was not present at the time of reporting but may have been present shortly beforehand or afterwards. This can artificially extend the range of tracking inhibitors.

The third location may correspond to the location of the same tracking transmitter whose location is included in the second report. Alternatively, the third location can correspond to a different tracking transmitter. In one example, when the server receives the second report from a user equipment and determines it comprises an indication of a nearby tracking inhibitor, the server may modify recent reports received from the same user equipment to reflect the presence of the tracking inhibitor near the locations in those reports.

In some embodiments, in response to receiving a subsequent third request message for the third location from a third user equipment of the plurality of user equipment, the one or more processors are configured to at least partially inhibit access to the third location by not sending the third location to the third user equipment in the first type of response message. The server may not send the third location at all, or may send the third location in the second type of report. In this way, the server further enhances security utilising the artificially extended range of the tracking inhibitor.

In some embodiments, the one or more processors are further configured to determine whether the second location and the third location are within a threshold distance from one another before modifying the stored third report. In this way, the server artificially can extend the range, or increase the signal strength, of tracking inhibitors. In one example, a tracking inhibitor may be close to two user equipment devices, but the signal may only reach one of the devices due to an interfering object or structure. Thus, the device not receiving the tracking inhibitor signal may report a location of a tracking transmitter without an indicator to indicate the presence of a nearby tracking inhibitor. In this case, the server can compare locations in stored reports to determine that both reports should be indicating the presence of the tracking inhibitor at their respective locations.

In some embodiments, the first indicator comprises an identifier associated with a tracking inhibitor. This can enable identification of the tracking inhibitor, or its user, which can have a number of uses. Each tracking inhibitor, user equipment and tracking transmitter in the system may be registered to one of a plurality of user accounts managed by the server. The server could also be configured to communicate with a different server or network that manages the registered accounts to check which transmitter belongs to which user. The first and second types of report may also comprise identifiers identifying the corresponding tracking transmitter whose location is being reported. The server may be configured to use this information, as well as the registered accounts, to determine if the owner of a tracking and tracking inhibitor match in the second report. In the event of a positive match, the server may provide only the owner of the tracking and tracking inhibitor uninhibited access to the location in the second report. This may be advantageous in the event that a genuine user loses an item tracked by their own tracking transmitter in the vicinity of one of their own tracking inhibitors.

In another example use, the server may be able to use these identifiers and the registered accounts to establish that a genuine user's user equipment and a tracking transmitter belonging to a different user and have been co-located for a predetermined period. The server may send an alarm message to the genuine user to alert the user to a possible malicious tracking transmitter in their belongings.

In some embodiments, the one or more processors are configured to provide the second user equipment access to the second location when a special condition is satisfied. The special condition may be an especially stringent security condition used in special circumstances. In one scenario, the owner of the second user equipment may be a genuine user. A thief may steal an item, such as a car, which they suspect is being tracked by the second tracking transmitter, and attempt to hide the location of the car by carrying a tracking inhibitor. In one example, the special condition may be that a police report has been filed and registered with the server to report the stolen car. The server can then, as an exception to the normal security precaution, provide the genuine user access to the second location. In this way, the server prevents abuse of the tracking system by retaining locations for access in special circumstances.

In some embodiments, the special condition is that the second user equipment and the tracking inhibitor providing the signal at or near the second location are registered to a common user. In this way, a user can receive the location of their own tracking transmitter even if it is in the vicinity of their own tracking inhibitor. This effectively implements a whitelist for each user that improves the usability of the system.

This type of tracking system relies on a server (such as the second aspect of the invention) to act as a conduit between location reporting devices in one location and location requesting devices in another location. Tracking transmitters typically have no location-determining ability to conserve battery power. The tracking inhibitors of the present invention may also have no location-determining ability of their own. The tracking transmitters and tracking inhibitors therefore rely on user equipment (e.g., of the first aspect of the invention) to report their locations to the server. It is therefore considered that any tracking system of this kind would require coordination between these aspects of the invention to implement the solutions described herein.

According to a further aspect of the invention, there is provided a method, performed in a tracking system, comprising: receiving and storing, from a plurality of user equipment, a first report including a first location of a first tracking transmitter and a second report including a second location of a second tracking transmitter and a first indicator configured to indicate that a signal from a tracking inhibitor has been received by one of the plurality of user equipment at or near the second location; receiving a first request from a first user equipment of the plurality of user equipment for the first location and, in response, granting the first request by sending the first location to the first user equipment in a first response message of a first type of response message; and receiving a second request from a second user equipment of the plurality of user equipment for the second location and, in response, at least partially inhibiting access to the second location by not sending the second location to the second user equipment in the first type of response message.

According to a further aspect of the invention, there is provided a non-transitory computer readable medium storing executable instructions that, when executed by a computer, cause the computer to perform steps comprising: receiving and storing, from a plurality of user equipment, a first report including a first location of a first tracking transmitter and a second report including a second location of a second tracking transmitter and a first indicator configured to indicate that a signal from a tracking inhibitor has been received by one of the plurality of user equipment at or near the second location; receiving a first request from a first user equipment of the plurality of user equipment for the first location and, in response, granting the first request by sending the first location to the first user equipment in a first response message of a first type of response message; and receiving a second request from a second user equipment of the plurality of user equipment for the second location and, in response, at least partially inhibiting access to the second location by not sending the second location to the second user equipment in the first type of response message.

The tracking inhibitor may only be provided to users on special request, for example in response to the grant of a restraining order. This may increase the usability of the tracking system by minimising the amount of tracking inhibitors in the system.

The tracking inhibitor (or tracking transmitter) may be configured as a smartphone or other type of user equipment, such as the user equipment of the first aspect of the invention. For example, the tracking inhibitor (or tracking transmitter) may be provided as a smartphone operating an application configured generate tracking inhibitor signals (or tracking transmitter signals) directly. This avoids the need for separate tracking devices. Alternatively, the tracking inhibitor may be configured as a standalone device. In either case, the device or user equipment implementing the tracking inhibitor (or tracking transmitter) may be operable in a tracking inhibitor mode and a tracking transmitter mode which allows the device to act as a tracking inhibitor or tracking transmitter, respectively, according to different needs of the user. The device programmed into one of the two modes during an initial pairing or initialisation procedure. Alternatively, the device may be switchable between modes using an input mechanism or instruction from a user delivered via a user equipment.

According to a further aspect of the invention there is provided a method in a tracking system for securing user privacy comprising the steps of: receiving at a receiver of a user equipment a first signal from a tracking transmitter and a second signal from an anti-tracking transmitter; determining in the user equipment that the location is to be flagged as private; creating a zone of privacy around the location defined by a range and/or a time window; prohibiting transmission of the location to a server.

According to a further aspect of the invention there is provided a method in a tracking system for securing user privacy comprising the steps of: receiving at a receiver of a user equipment a first signal from a tracking transmitter and a second signal from an anti-tracking transmitter; determining in the user equipment that the location is to be flagged as private in response to the receipt of the second signal; sending to a server a location of the user equipment and an indication that the location is private; creating a zone of privacy around the location defined by a range and/or a time window.

According to a further aspect of the invention there is provided a method in a tracking system for securing user privacy comprising the steps of: receiving at a receiver of a user equipment a first signal from a tracking transmitter and a second signal from an anti-tracking transmitter; sending to a server a location of the user equipment in response to the receipt of the second signal; determining in the server that the location is to be flagged as private; creating a zone of privacy around the location defined by a range and/or a time window.

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the invention presented herein. The invention is not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e., within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g., one or more of A, B, and/or C), unless stated otherwise, it is understood to include one or more of each element, including any one or more combinations of any number of the enumerated elements (e.g., A, AB, AC, ABC, ABB, etc.). When "and/or" is used, it should be understood that the elements may be joined in the alternative or conjunctive.

While the foregoing is directed to embodiments of the present invention, other and further embodiments of the invention may be devised without departing from the basic scope thereof, and the scope thereof is determined by the claims that follows.

The invention claimed is:

1. A method for providing user privacy within a tracking system comprising:
    creating a zone of privacy within which tracking signals, transmitted by a tracking device located within the privacy zone, cannot be used to identify a location of the tracking device by emitting privacy signals from a tracking inhibitor located nearby the tracking device, wherein the privacy signals from the tracking inhibitor are received by a networked transceiver that causes the networked transceiver to not send information regarding the tracking device to a tracking server, or causes a tracking server to not send a location of the tracking device to any networked transceiver requesting the location of the tracking device.

2. The method of claim 1, wherein the tracking inhibitor is part of the networked transceiver.

3. The method of claim 1, wherein the tracking inhibitor is a different device than the networked transceiver.

4. The method of claim 1, wherein the zone of privacy comprises a zone defined by a geographic distance from at least one of the tracking inhibitor, the tracking device, or the networked transceiver.

5. The method of claim 1, wherein the zone of privacy includes a time component such that tracking signals emitted from the tracking device received before or after a privacy signal from the tracking inhibitor is received will be tracking inhibited.

6. The method of claim 1, wherein causing the tracking server to not send a location of the tracking device to any networked transceiver requesting the location of the tracking device includes:
    upon receiving privacy signals from a tracking inhibitor, the networked transceiver transmits at least one of:
        tracking information for the tracking device along with a privacy indicator to the tracking server indicating the tracking information was received from a transmitter within a privacy zone; or
        tracking information for the tracking device and tracking inhibitor information to the tracking server indicating the tracking information was received from a transmitter within a privacy zone.

7. Apparatus for providing user privacy within a tracking system comprising a processor configured to create a zone of privacy within which tracking signals, transmitted by a tracking device located within the privacy zone, cannot be used to identify a location of the tracking device by emitting privacy signals from a tracking inhibitor located nearby the tracking device, wherein the privacy signals from the tracking inhibitor are received by a networked transceiver that causes the networked transceiver to not send information regarding the tracking device to a tracking server, or causes a tracking server to not send a location of the tracking device to any networked transceiver requesting the location of the tracking device.

8. The apparatus of claim 7, wherein the tracking inhibitor is part of the networked transceiver.

9. The apparatus of claim 7, wherein the tracking inhibitor is a different device than the networked transceiver.

10. The apparatus of claim 7, wherein the zone of privacy comprises a zone defined by a geographic distance from at least one of the tracking inhibitor, the tracking device, or the networked transceiver.

11. The apparatus of claim 7, wherein the zone of privacy includes a time component such that tracking signals emitted from the tracking device received before or after a privacy signal from the tracking inhibitor is received will be tracking inhibited.

12. The apparatus of claim 7, wherein causing the tracking server to not send a location of the tracking device to any networked transceiver requesting the location of the tracking device includes:
    upon receiving privacy signals from a tracking inhibitor, the networked transceiver transmits at least one of:
        tracking information for the tracking device along with a privacy indicator to the tracking server indicating the tracking information was received from a transmitter within a privacy zone; or
        tracking information for the tracking device and tracking inhibitor information to the tracking server indicating the tracking information was received from a transmitter within a privacy zone.

13. A tracking server for providing selective user privacy within a tracking system, comprising one or more processors configured to:
    receive a tracking request including a tracking transmitter ID of a tracking device from one or more networked transceivers requesting the location of the tracking device;
    determine if the tracking device is in a privacy zone based on at least one of (A) the tracking transmitter ID, or (B) a privacy indicator included in the tracking request; and
    if it is determined that the tracking device is in a privacy zone, block the tracking request and not send the location of the tracking device to the one or more networked transceivers requesting the location of the tracking device.

14. The tracking server according to claim 13, wherein the tracking server transmits a reply to the tracking request using a rejection message that indicates to the requesting one or more networked transceivers that the tracking device is currently located in a privacy zone and the location is unavailable.

15. The tracking server according to claim 13, wherein the tracking server transmits a reply to the tracking after a delay such that a tracking device within a zone of privacy cannot be tracked in real-time.

* * * * *